(12) United States Patent
Roth et al.

(10) Patent No.: US 6,228,319 B1
(45) Date of Patent: May 8, 2001

(54) PORTABLE DROSS PRESS WITH RISING AND DUMPING POT

(75) Inventors: David J. Roth, Downingtown; Peter G. Schirk, Devon, both of PA (US)

(73) Assignee: Altek International, Inc., Exton, PA (US)

(*) Notice: Subject to any disclaimer, the term of this patent is extended or adjusted under 35 U.S.C. 154(b) by 0 days.

(21) Appl. No.: 09/245,817

(22) Filed: Feb. 5, 1999

Related U.S. Application Data (60) Provisional application No. 60/085,106, filed on May 12, 1998.

(51) Int. Cl.$^7$ .................................................. C21B 3/04
(52) U.S. Cl. ............................................ 266/205; 266/227
(58) Field of Search ................................ 266/200, 205, 266/227, 201

(56) References Cited

U.S. PATENT DOCUMENTS

| | | | |
|---|---|---|---|
| 3,798,024 | 3/1974 | Murphy et al. | 75/68 |
| 4,050,926 | 9/1977 | Lawson et al. | 75/78 |
| 4,057,232 | 11/1977 | Ross et al. | 266/227 |
| 4,073,481 | 2/1978 | Lawson et al. | 266/215 |
| 4,386,956 | 6/1983 | Roth et al. | 75/227 |
| 4,523,949 | 6/1985 | Gower et al. | 75/24 |
| 4,527,779 | 7/1985 | Roth et al. | 266/227 |
| 4,540,163 | 9/1985 | van Linden et al. | 266/210 |
| 4,952,237 | 8/1990 | Dube et al. | 75/10.19 |
| 4,959,100 | 9/1990 | Dube et al. | 75/10.19 |
| 5,020,778 | 6/1991 | Thibault et al. | 266/89 |
| 5,397,104 | 3/1995 | Roth | 266/227 |
| 5,540,752 | 7/1996 | Spoel | 75/380 |
| 5,669,957 | * 9/1997 | Roth | 266/227 |
| 5,882,580 | * 3/1999 | Pownall | 266/205 |
| 5,980,817 | * 11/1999 | Pownall | 266/205 |

\* cited by examiner

*Primary Examiner*—Scott Kastler
(74) *Attorney, Agent, or Firm*—Michael F. Petock, Esq.

(57) ABSTRACT

A portable dross pressing apparatus utilizes a frame which may be made portable by wheels, by forklift tubes or the like. A press head is mounted to an upper portion of the portable frame and a drive means is used to force a skim pot upwardly into juxtaposition with the press head wherein dross within the skim pot may be compressed between the skim pot and the press head. The pot and/or head may contain ribs which may or may not mate. The pressing components may be made of cast steel or of a refractory material, such as ceramic. A pot of refractory material would be constructed over a metal shell for reinforcement. Preferably, the skim pot and sow mold are mounted within a traveling frame which is movably mounted to the portable frame. The skim pot may be provided with an automatic dumping mechanism and the sow mold may be mounted on a slide drawer mechanism. In a preferred embodiment, the skim pot is provided with means for preheating which may either be a gas burner or electrical resistance heaters. In the refractory skim pot, electrical resistance heaters may be mounted within the refractory material. In another aspect, skim pots may be constructed with a removable insert drain hole structure. Dross pressing apparatus may be provided with vibratory motion upon full compression.

29 Claims, 8 Drawing Sheets

PORTABLE DROSS PRESS WITH RISING AND DUMPING POT

CROSS REFERENCE TO RELATED APPLICATIONS AND PATENTS

This application claims the benefit of U.S. Provisional Application Ser. No. 60/085,106, filed May 12, 1998. The teachings of U.S. Pat. No. 5,397,104-Roth and U.S. Pat. No. 5,669,957-Roth are incorporated by reference herein the same as if set forth at length.

FIELD OF THE INVENTION

This invention relates to an improved apparatus for the recovery of metal, particularly aluminum, from dross. The present invention more particularly relates to a dross pressing apparatus which contains a number of significant advantages over the art including, but not limited to, portability, a rising pot, a pot with dumping action, use of refractory material in the pressing components, preheating of the pot, vibratory motion on full compression and a slide drawer mounted sow mold.

BACKGROUND OF THE INVENTION

Aluminum dross is a combination of aluminum metal and aluminum oxides, as well as other possible components such as various oxides, nitrates and carbides.

A number of dross pressing apparatus have been invented and utilized in the past. Two prior patents by David Roth, one of the inventors herein, are cited above and incorporated herein by reference. Other work has been done on dross recovery systems for aluminum melting including work disclosed in U.S. Pat. No. 4,527,779-Roth et al. and U.S. Pat. No. 4,386,956-Roth et al., of which the inventor herein is a joint inventor. The teachings of these patents are also incorporated herein by reference the same as if set forth at length.

SUMMARY OF THE INVENTION

The present invention provides a number of advantages over the prior art. One advantage of the present invention is that it provides a portable dross pressing apparatus which may be readily moved about a facility in which there is a need for dross pressing. In accordance with the present invention, this may be done by having the dross press constructed in a frame mounted on wheels, on a pallet jack, on skids or by providing it with forklift tubes for ease of transportation.

Another advantage of the present invention is the use in a portable press of a rising skim pot. This provides several advantages including increased stability as a result of the heavier components having a lower center of gravity, including the drive means for the pressing action being located lower in the frame. This is particularly important where the frame is being moved around the facility. Another advantage of the rising skim pot is a safer structure for a portable unit of this type as the risk of a press head falling is reduced.

Another advantage of the present invention is the provision of a refractory pot and or head which may be constructed of a suitable material, such as ceramic. In accordance with the present invention, the refractory pot may be comprised of a refractory material mounted to a metal shell for reinforcement.

Another advantage of the present invention is a removable/replaceable drain insert which provides longer life for the skim pot since the drain area is the area of greatest wear.

Another advantage of the present invention is the providing of vibratory action on full compression.

Another advantage of the present invention is the providing of a press where the skim pot may automatically dumped.

Another advantage of the present invention is the preheating of the skim pot.

Another advantage of the present invention is the provision of an electric motor driven compression system.

Another advantage of the present invention is the providing a sow mold in a dross press which is mounted on a slide drawer mechanism.

Another advantage of the present invention is the providing of an electric battery powered fully portable dross press or dross compression apparatus.

Briefly and basically, in accordance with the present invention, a dross compression apparatus is provided which comprises a portable frame with a press head mounted to an upper portion of the frame and means for forcing a skim pot upwardly into juxtaposed position with the press head wherein dross within the skim pot may be compressed between the skim pot and the press head.

The frame may be made portable by wheels mounted to the frame, mounting on a pallet jack, on skids or by the provision of forklift tubes mounted to the frame.

The dross press may include ribs on the head and or the inner surface of the skim pot. Where ribs are provided on both the head and the skim pot, these may or may not be mating. Mating ribs on the head and pot provide advantages as described in U.S. Pat. No. 5,669,957.

The press head may be constructed of a refractory material, such as ceramic material. The pot may also be constructed of refractory material with a reinforcing metal shell.

The rising skim pot is preferably mounted in a traveling frame mounted to the portable frame. The skim pot in the mounted frame may be driven upwardly by a hydraulic piston or by an electric motor drive means. A sow mold may be mounted within the traveling frame on a slide drawer structure wherein the sow mold may be slidably moved in a horizontal plane to a position where the sow mold is outside of the frame.

Electric or gas preheaters may be utilized to preheat the skim pot. The electric preheaters may be in the form of electric resistance heaters mounted within the refractory material of the skim pot.

The skim pot may be provided with a removable insert in a lower portion of the skim pot. The removable insert would include at least one drain hole. In this manner, the drain area may be replaced without replacement of the entire skim pot.

Additionally, vibratory motion may be provided when the skim pot is in full compression in juxtaposition of the head.

BRIEF DESCRIPTION OF THE DRAWINGS

For the purpose of illustrating the invention, there are shown in the drawings forms which are presently preferred; it being understood, however, that this invention is not limited to the precise arrangements and instrumentalities shown.

DETAILED DESCRIPTION OF THE PREFERRED EMBODIMENTS

Figure 1:
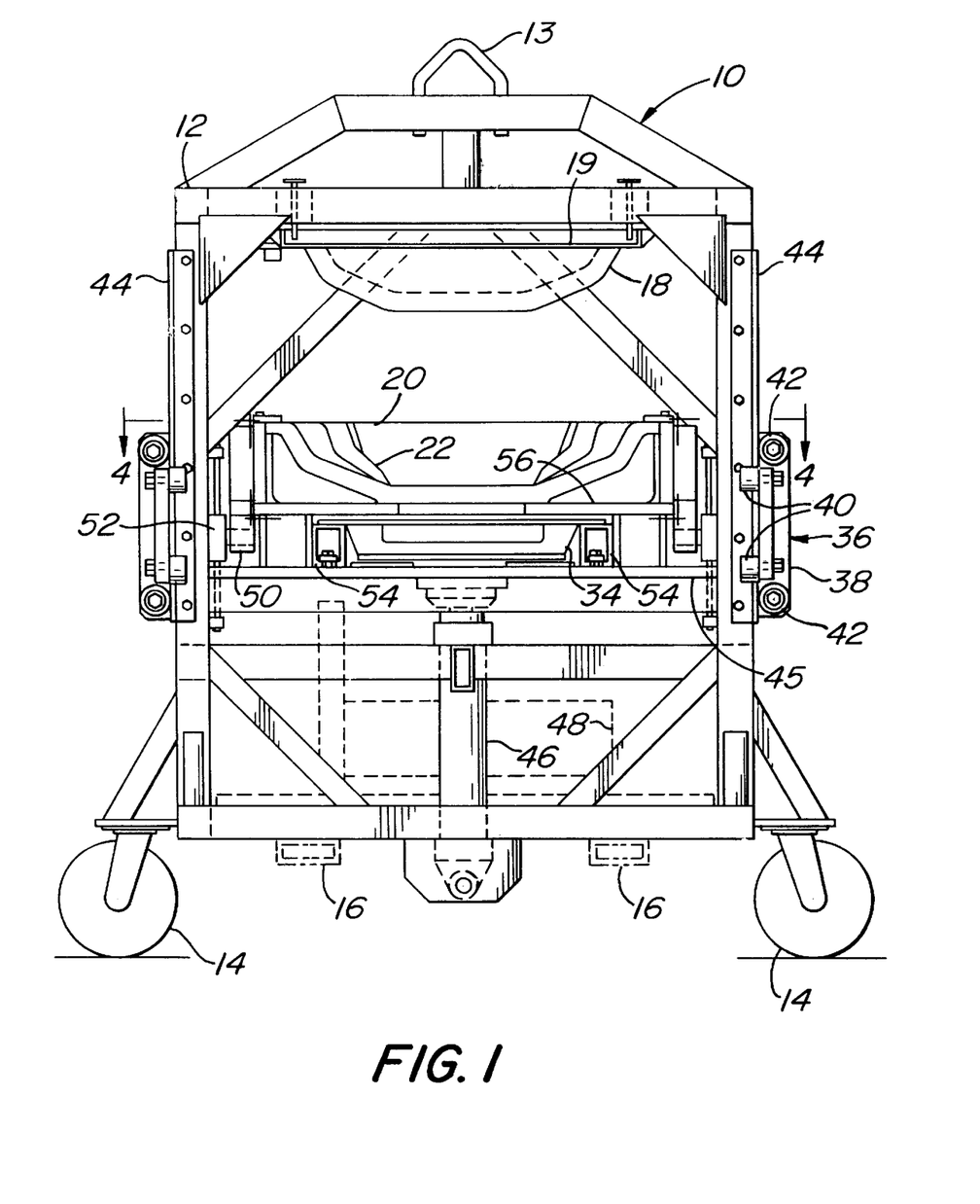
FIG. 1 is a front elevation view of a portable dross press with a rising and dumping pot in accordance with the present invention.
Figure 2:
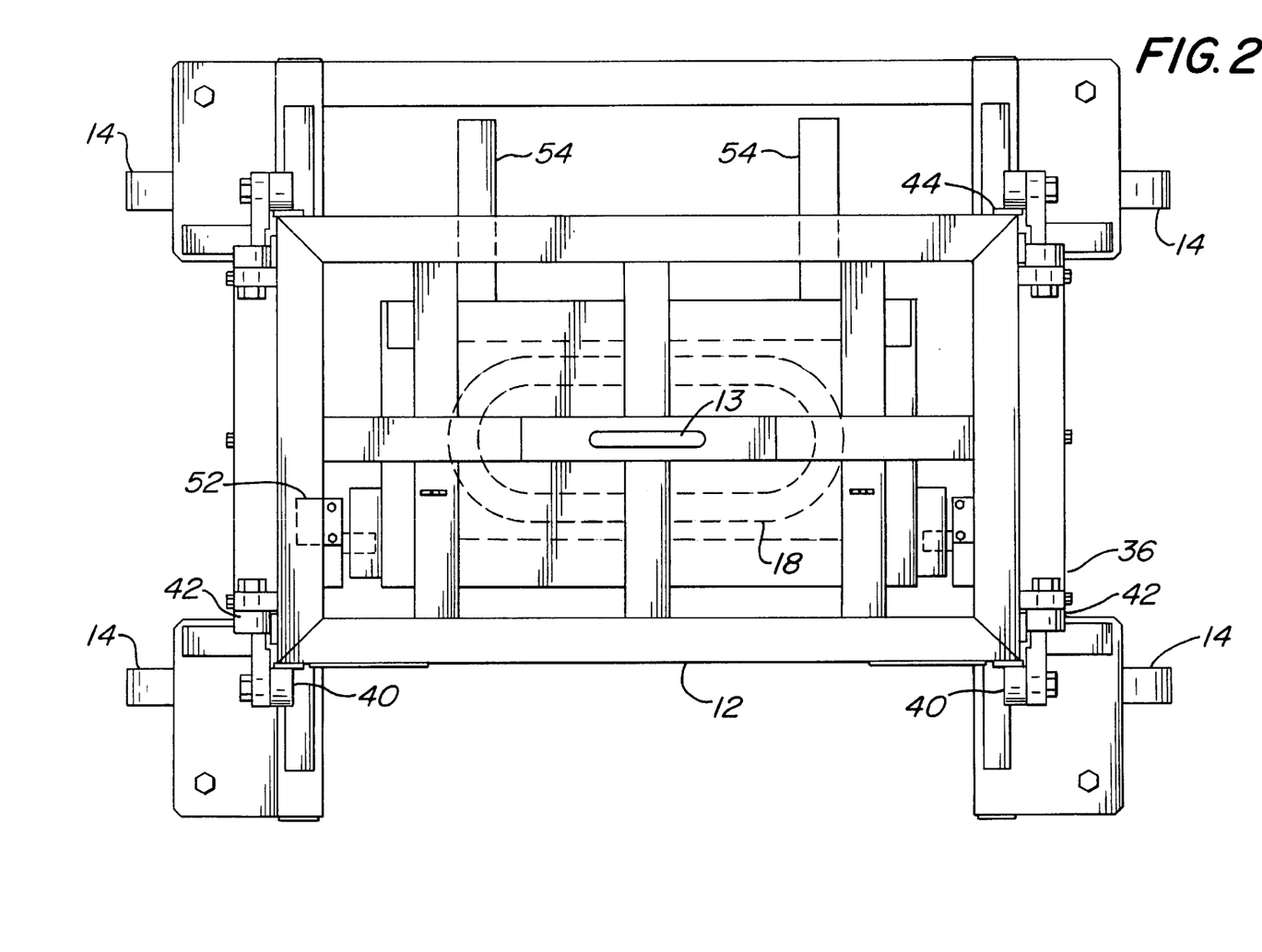
FIG. 2 is a plan view of the dross press of FIG. 1.

Referring now to the drawings, wherein like numerals indicate like elements, there is shown in FIG. 1 a portable dross compression apparatus or a portable dross press 10. Dross press 10 includes a frame 12 which is made portable by either wheels 14 or forklift tubes 16. A plan view of the frame and four wheels 14 are seen in FIG. 2. The four wheels 14 may be rotatable about a vertical axis for ease of steerability or two wheels may be fixed and two wheels rotatable about a vertical axis. The wheels may also be locked to secure the dross press in place. Forklift tubes 16 may be used to receive the forks of a forklift truck for transportation of portable dross press 10 about a facility as desired. This may be used with or without wheels 14. Frame 12 may also be provided with a hook 13 for lifting of the entire portable dross press.

Figure 3:
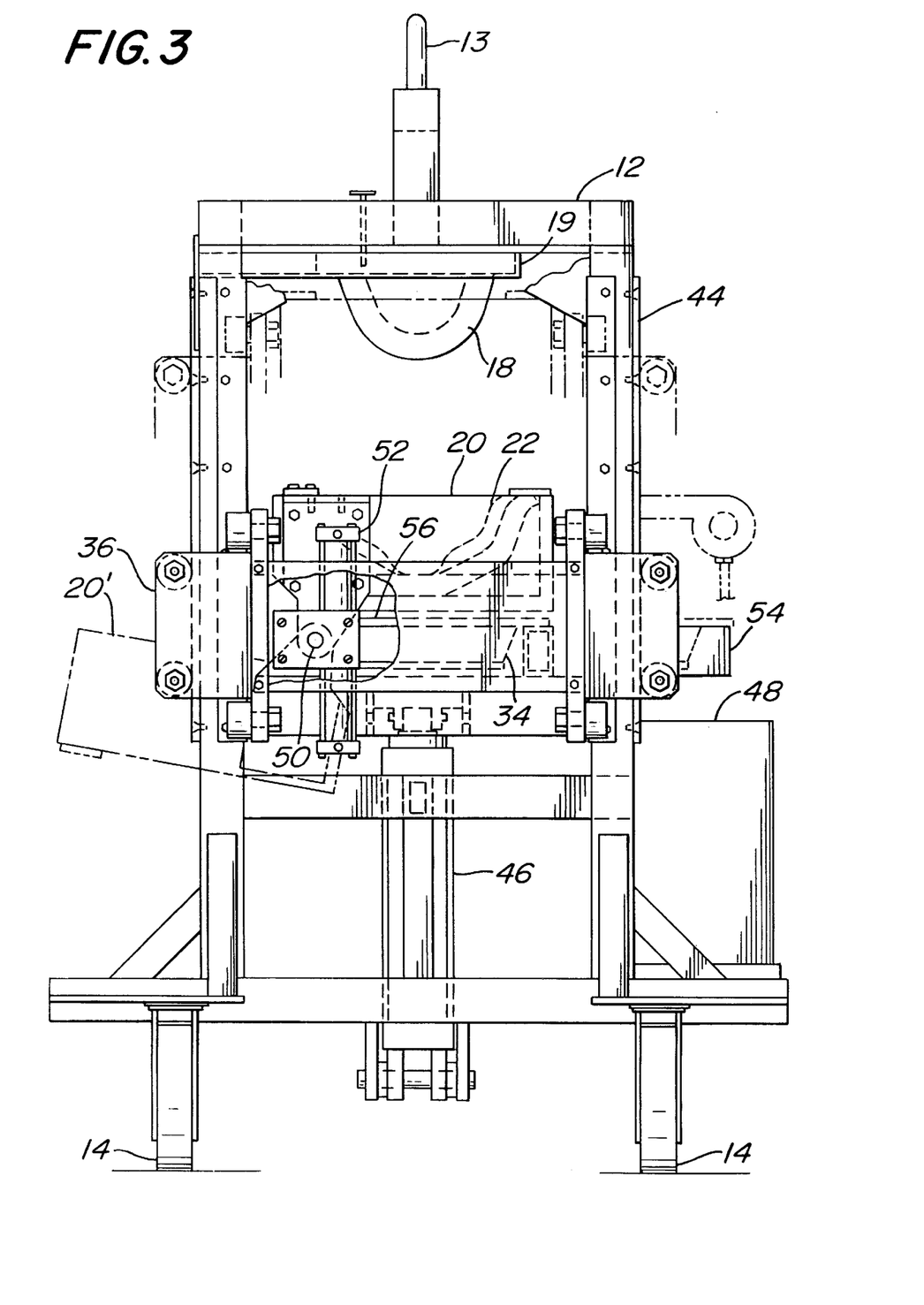
FIG. 3 is a side elevation view of the dross press of FIG. 1, also showing the skim pot in dotted lines in the dumping position.
Figure 5:
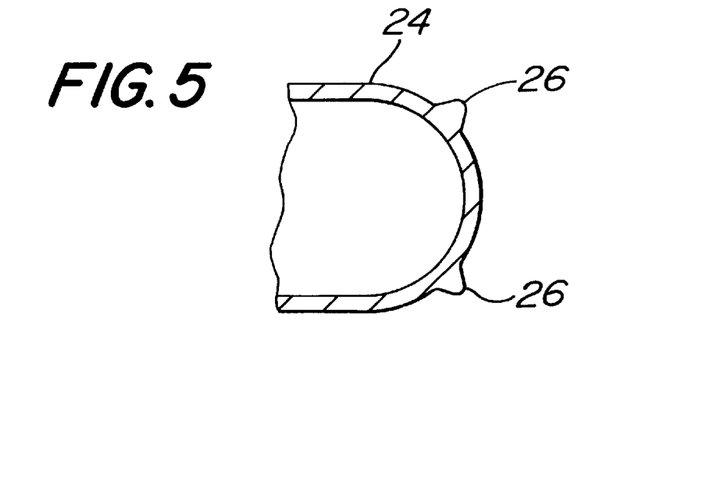
FIG. 5 is a broken away cross sectional view of another embodiment of a head disclosing ribs thereon.

Referring now to FIGS. 1 through 3, there is shown a press head 18 mounted to an upper portion of frame 12. Press head 18 is adapted to mate with a dross collector or skim pot 20. Press head 18 and skim pot 20 may be constructed of cast steel and may be provided with ribs for creasing the dross material therebetween as described in the prior U.S. Pat. Nos. 5,397,104 and 5,669,957 assigned to the assignee herein. As shown in the preferred embodiment in FIGS. 1 through 3, press head 18 is not provided with ribs, but collector or skim pot 20 is so provided with ribs 22. An embodiment of a head with ribs is shown in FIG. 5 wherein a head 24 is provided with ribs 26. Ribs may be provided on either the head or the skim pot or both. The ribs on the head and skim pot may or may not mate as described in U.S. Pat. No. 5,669,957.

Alternatively, press head 18 and skim pot 20 may be constructed using refractory material such as ceramic. A suitable such ceramic is commercially available from Thermal Systems America, Canastota Industrial Park, Madison Boulevard, Canastota, N.Y. 13032-9424 using a Reftech 70-20 material with suitable refractory reinforcement. In a presently preferred embodiment, and disclosed herein by way of example and not by way of limitation, such a ceramic material may be that which is commercially available as Refcast LoCem 7020 which is a high purity mullite based, silicon carbide enhanced, low cement castable which exhibits very high strengths, excellent abrasion resistance and increased thermal shock properties.

Head 18 may be constructed of relatively thick ceramic material where a substantial volume of the head is comprised of ceramic material to provide sufficient structural rigidity. The precast refractory press head may be cast preferably from Reftech 70-20 (Refcast LoCem 7020) with suitable refractory reinforcement. However, other ceramic material may be used. Threaded inserts, used for lifting and bolting refractory press head into place, may be used. A 1 inch thick steel plate shown at 19 may be bolted to the refractory press head for structural support. The press head may be fired to 1000 degrees Fahrenheit for a complete dry out prior to use.

Figure 6:
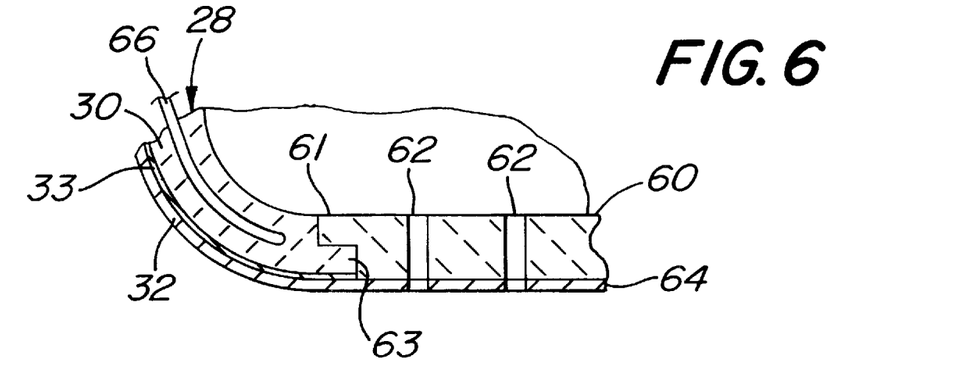
FIG. 6 is a broken away cross sectional view of a portion of a skim pot with a removable drain insert.

In the case of the skim pot, it is presently preferred to provide the outer layer of the skim pot in the form of a metal, such as steel to provide a reinforcing structure for the ceramic material which makes up the skim pot. Such a skim pot 28 is shown in FIG. 6 wherein the refractory or ceramic material 30 is supported by an outer shell of metal 32, which is preferably steel. By way of example and not limitation, in a presently preferred embodiment, the outer shell of metal 32 may be fabricated using ⅜ inch and ½ inch plate steel with welded construction, although it is understood that other metals may be utilized and the shell may be cast. The precast refractory dross skim pot may be installed into a steel shell using ½ inch thick AP Green Insboard 2300 insulation on the bottom and 1 inch thick AP Green Insboard 2300 insulation on the sidewalls. Such an insulation layer is shown at 33 in FIG. 6 between refractory material 30 and reinforcing metal shell 32. A dry castable grout is installed between the precast refractory shape and the insulation board. The dross skim pot is preferably clamped down using hold down clamps (not shown).

Referring now more particularly to FIGS. 1–3, it may be seen that skim pot 20, along with sow mold 34 is mounted in a traveling frame 36. Traveling frame 36 rides on portable frame 12 by means of guide roller assemblies 38. Each guide roller assembly 38 is comprised of a pair of spaced rollers 40 and another pair of spaced rollers 42 which ride on outside edges respectively of vertical frame members 44 of portable frame 12. Traveling frame 36 is driven upwardly to compress dross within skim pot 20 against head 18 by means of a hydraulic cylinder 46. An electric drive motor may be utilized in place of hydraulic cylinder 46. The motor and hydraulic pump, which are conventional and commercially available are shown as contained in its housing 48.

The entire portable dross press frame 12 may be enclosed within metallic screening for safety purposes. The screening would have a door which opens on the front for access to the skim pot and sow mold. This door preferably would open by riding vertically in channels. The door would also be provided with appropriate interlocks so that the hydraulic cylinder 46 could not be operated unless this safety door was closed. Such screening and doors with appropriate interlocks are standard and conventional in this art and are not shown as it would tend to obscure and make obtuse the structure of the portable dross press 10.

As may be best seen in FIG. 3, skim pot 20 is mounted on a pivot 50 and is rotatable around pivot 50 by drive means 52 such that skim pot 20 may be rotated to its dumping position as shown in dotted outline form at 20' in FIG. 3.

Figure 4:
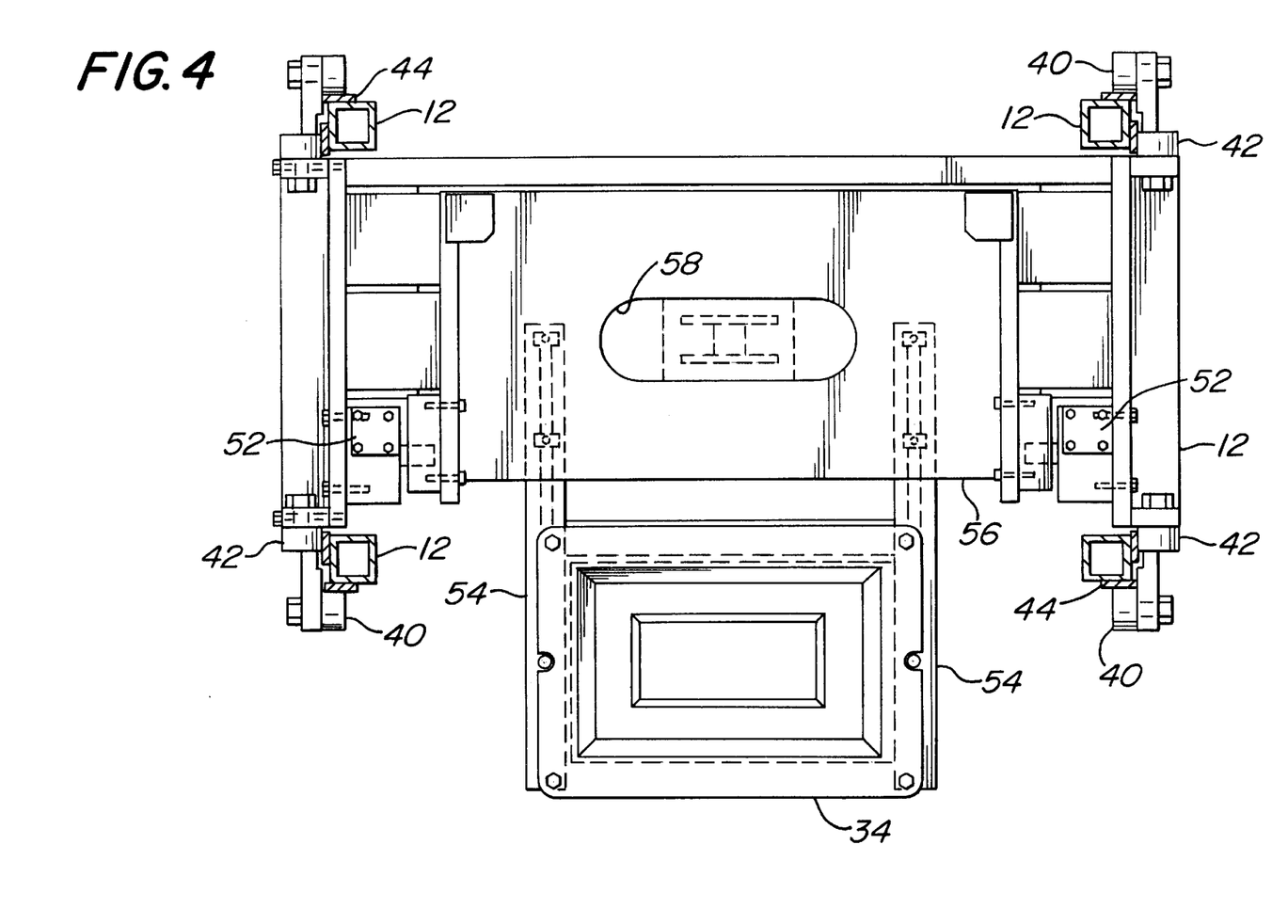
FIG. 4 is a plan view taken along line 4—4 of FIG. 1 with the sow mold on a slide means in an extended position outside of the frame of the portable dross press.

As may be best seen in connection with FIGS. 1 and 4, sow mold 34 is mounted on a pair of slide drawer mechanisms 54. The slide drawer mechanism is preferably constructed of tubing that has been slotted. The tubes slide along horizontal frame plate 45 of frame 44. However, other slider mechanisms may be utilized, including U channel shaped members of sufficient rigidity, concentrically arranged rectangular tubing members with rollers mounted therein to reduce friction or other conventual slide drawer type mechanisms. Sow mold 34 is shown in its extended position on slide drawer mechanism 54 outside of frame 12. In its retracted position, sow mold 34, as shown in FIGS. 1, 2 and 3 is positioned under skim pot 20 and receives aluminum metal from skim pot 20. The slide drawer mechanism allows the sow mold 34 to be selectively and easily moved from its retracted to its extended position and vice versa. A plate 56 is provided between skim pot 20 and sow mold 34 to help provide structural rigidity for traveling frame 36. Opening 58 in plate 56 allows molten aluminum and the like to flow from skim pot 20 into sow mold 34.

Figure 7:
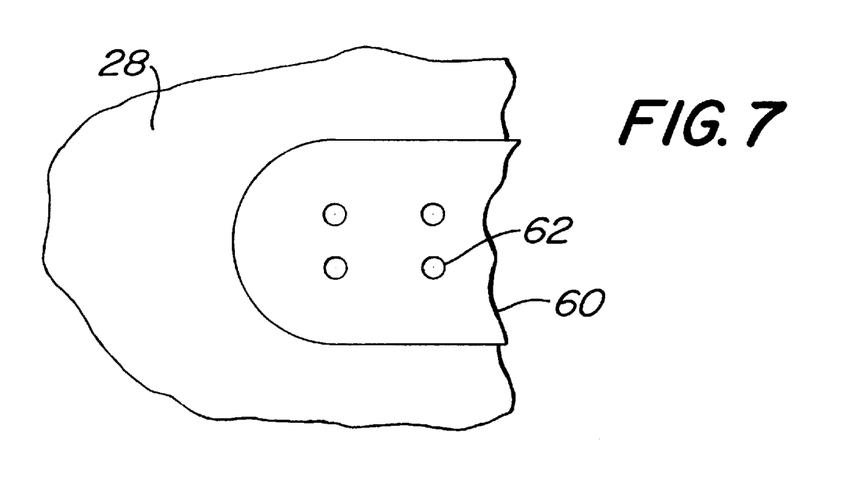
FIG. 7 is a plan view of the base of a skim pot in accordance with FIG. 6 showing the removable drain insert.

Referring to FIG. 6 and 7, there is shown another embodiment of the invention wherein a removable drain insert 60 may be provided in a lower portion of a skim pot 28. This removable insert structure may be utilized in connection with either steel or refractory skim pots. It is illustrated in FIG. 6 as being a refractory metal reinforced skim pot having a replaceable refractory or ceramic insert 60 having drain holes 62. The refractory drain insert may or may not be provided with a steel or other metal reinforcement plate 64 as illustrated in FIG. 6. As illustrated in FIG. 6, a presently preferred embodiment of a removable drain insert would have a lip 61 which sits on extension 63 of the ceramic or refractory material 30 of skim pot 28. It is understood throughout that the refractory material of the skim pot and head may be of various types of refractory material. One such type of refractory material would be ceramic. Preferably, by way of example, but not limitation, the ceramic material may preferably be Refcast LoCem 7020 discussed above. Further, it is understood that various other means of securing a removable drain insert within a skim pot may be utilized within the scope and spirit of the present invention.

As illustrated in FIG. 7, which is a plan view of FIG. 6, the skim pot therein is shown in plan view and the removable insert 60 may be constructed of either metal such as steel or ceramic material. Where the skim pot is constructed of cast steel, there would be no need for any reinforcement shell.

Also shown in FIG. 6 is one of two means for preheating the skim pot to provide enhanced results in the pressing operation. This is particularly important when the machine is first put into use on a particular day or during a particular shift, or where the machine has not had hot dross in it for some time. As shown in FIG. 6, there is an electrical resistance heater 66 embedded within the refractory material. Another method of preheating the skim pot is to provide a gas burner 68 as illustrated in dotted lines in FIG. 3. Gas heater 68 is fed by a gas line 70 and may be mounted by suitable means not shown. The gas line 70 may be connected to a natural gas line or to a propane tank or the like mounted to frame 12.

Figure 8:
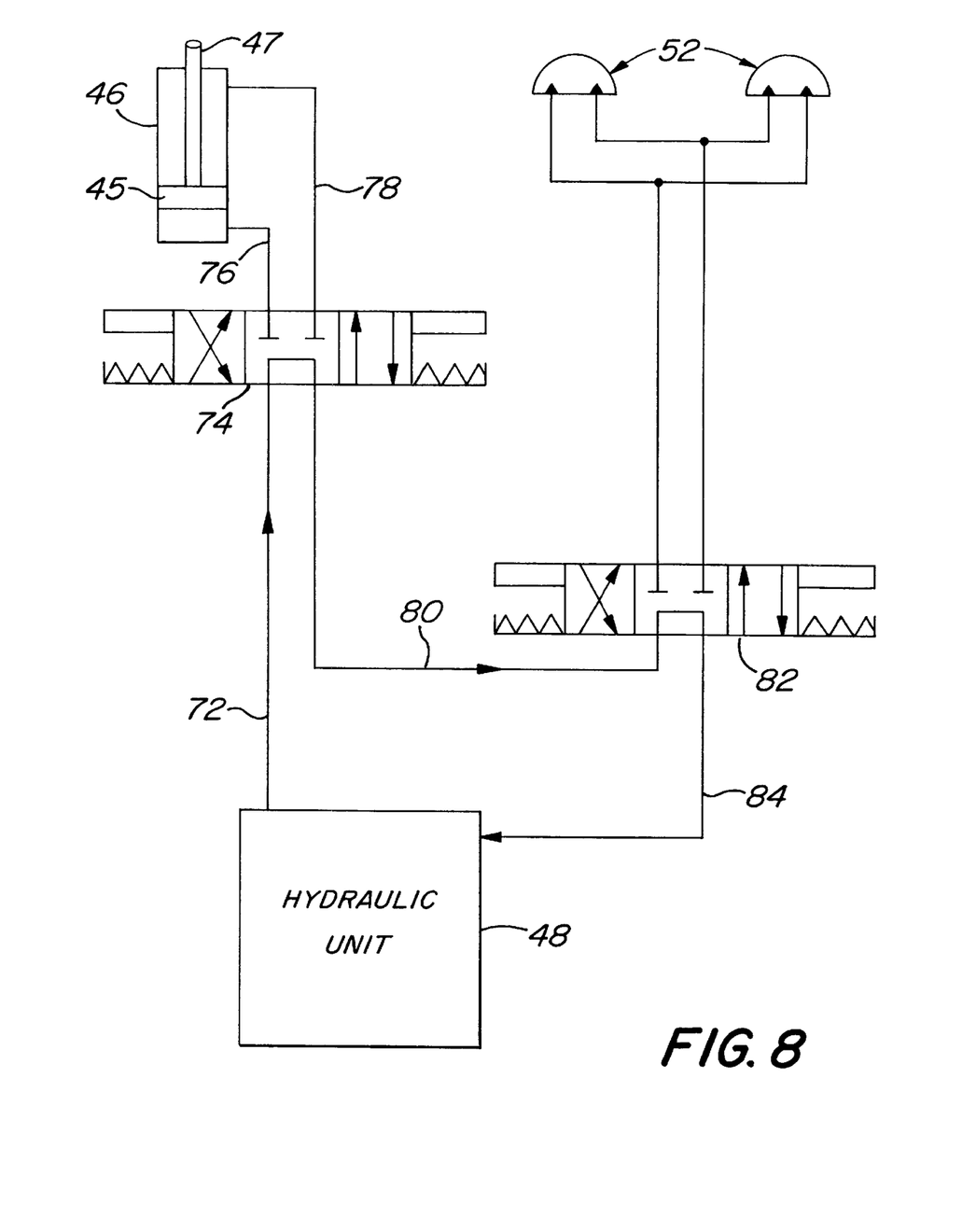
FIG. 8 is a schematic diagram of a hydraulic system which may be utilized in accordance with a preferred embodiment of the present invention.

Referring now to FIG. 8, there is a schematic diagram of a preferred embodiment of a hydraulic system which may be utilized in connection with the present invention to cause raising and lowering of traveling frame 36 containing skim pot 20, control of the dumping action via dumping drive means 52 and to provide vibratory motion on full compression. As illustrated in FIG. 8, hydraulic unit 48 includes a pump, cooler, reservoir and certain valves. In FIG. 8, certain of the valves are illustrated above hydraulic unit 48 in greater detail. This corresponds to the hydraulic pump unit previously referred to in connection with FIGS. 1 and 3.

As may be seen in FIG. 8, hydraulic fluid is pumped out of hydraulic unit 48 via line 72 to valve 74. By control of valve 74, hydraulic fluid may be pumped via line 76 to raise the piston 45 of hydraulic cylinder 46. Switching valve 74 to cause fluid flow into line 78 causes the piston to be lowered. Accurate control of piston 46 may be achieved in this manner. Of course, as hydraulic fluid is pumped into hydraulic cylinder 46 via line 78, fluid flow is allowed to be released via line 76. This hydraulic control of a cylinder is known in the art. However, on full compression, when piston 45 and piston rod 47 are forced upwardly to the maximum degree causing compression of the dross between press head 18 and skim pot 20, valve 74 may be switched back and forth repetitively in relatively rapid sequence causing a vibratory compression of the dross between head 18 and skim pot 20.

In a similar manner, hydraulic fluid may flow via line 80 to valve 82 for control of rotary actuator 52. Rotary actuator 52 may be a PTR/LTR series actuator manufactured by and commercially available from Parker Hanafin Corporation, Rotary Actuator Division, Wadsworth, Ohio 44281. Hydraulic fluid is returned to hydraulic unit 48 via line 84.

Figure 9:
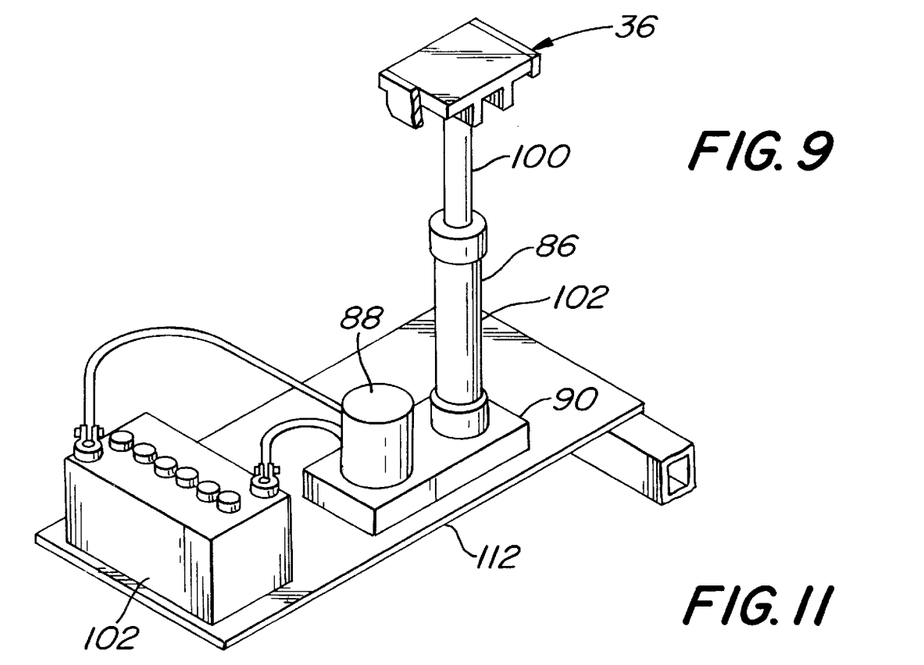
FIG. 9 is a partial broken away view in perspective of an alternate embodiment of the present invention utilizing a battery powered electrically driven dross press.

Referring now to FIG. 9, there is shown a broken away partial view of another embodiment of the present invention which utilizes an electric drive to raise and lower traveling frame 36 which contains skim pot 20. This electric drive may be powered by a battery making the portable dross press completely portable. As shown in FIG. 9, there is a broken away portion of a frame 112 which may be substantially identical to frame 12. Frame 112 has mounted thereon an electric drive unit 86 comprised of an electric motor 88 and a gear drive 90. The operation of the motor causes a gear driven rod 100 to be extended or retracted from housing 102. An electric drive unit which may be suitable for use as electric drive unit 86 is commercially available from Duff-Norton Electro Mechanical Linear Actuators, P.O. Box 7010, Charlotte, N.C. 28241-7010. As illustrated in FIG. 9, electric motor 88 may be driven from battery 102. Battery 102 would be a rechargeable battery. Battery 102 or similar batteries could also be utilized to operate an electrically driven dumping actuator and to provide electrical resistance preheating. Alternatively, an electrically operated model could be the type which electrically connects to 110 Volts AC.

Figure 10:
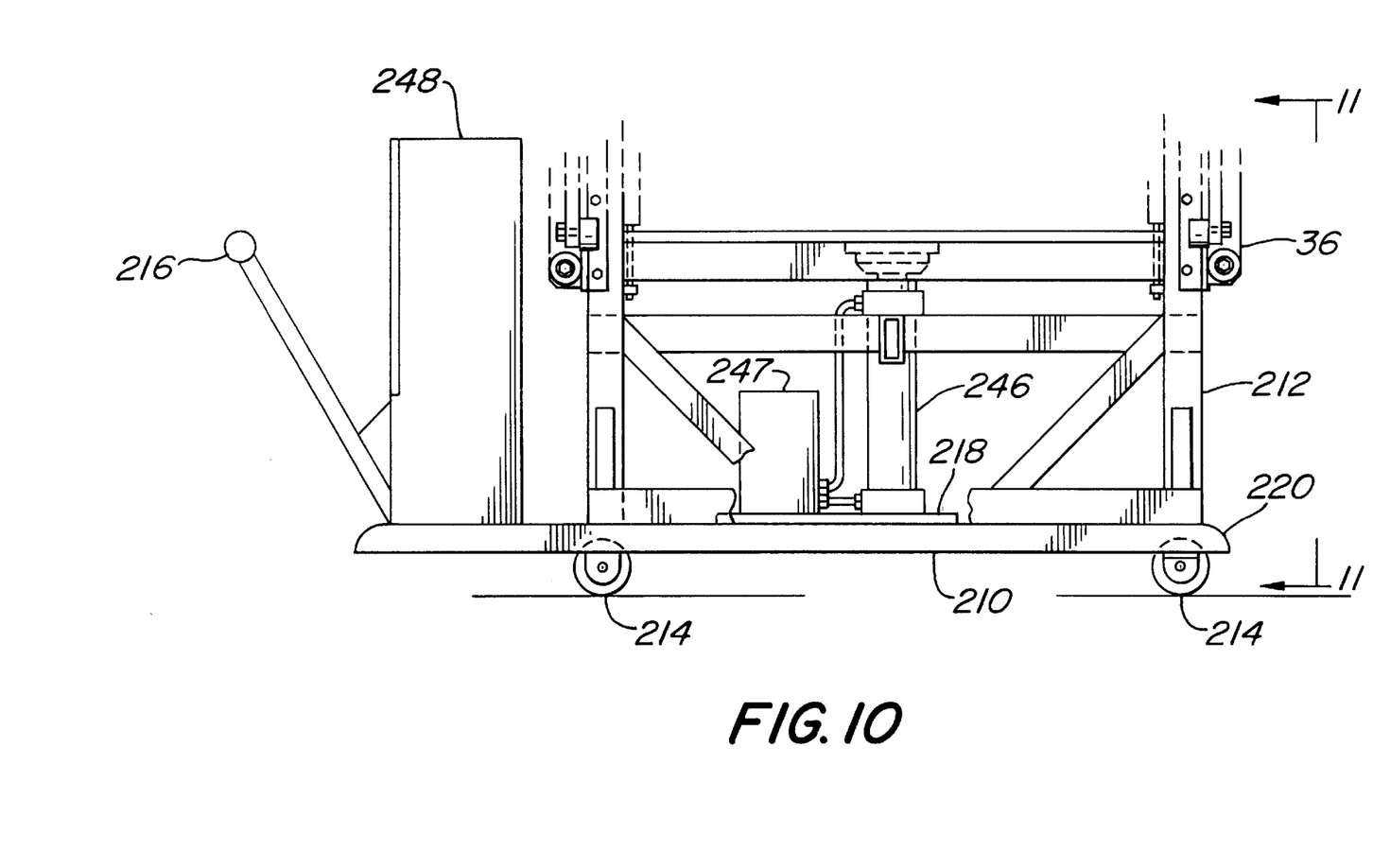
FIG. 10 is a partial broken away side elevation view of an alternate embodiment of the present invention utilizing a dross press constructed on an electric pallet jack.
Figure 11:
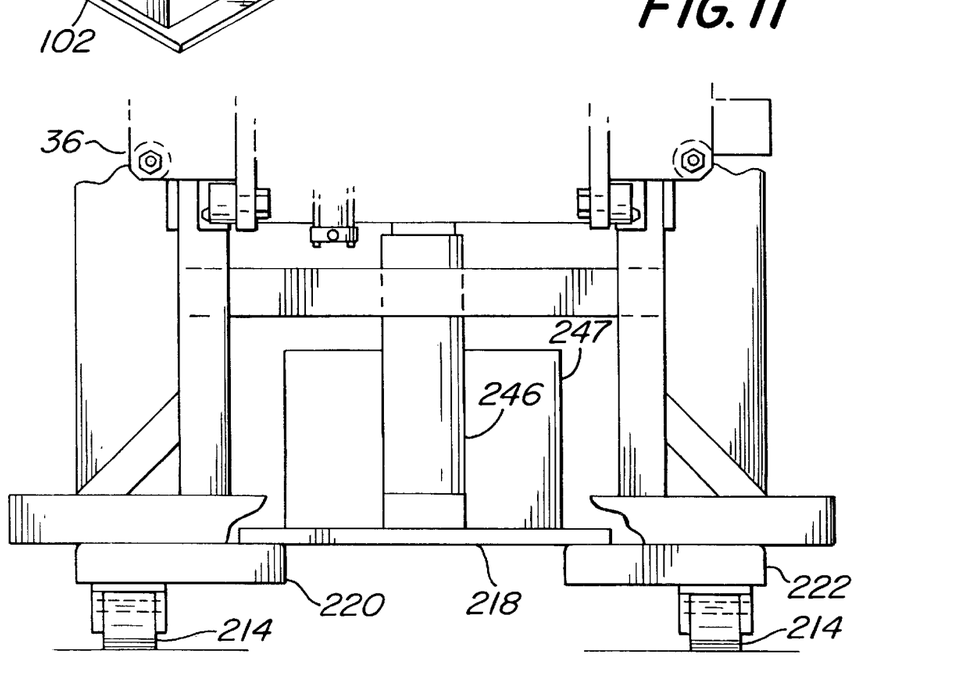
FIG. 11 is a partial elevation view taken along line 11—11 of FIG. 10.

Referring now to FIGS. 10 and 11, there is shown another embodiment of the present invention wherein a dross pressing apparatus may be constructed on a structure similar to an electric pallet jack utilizing some of the components of the electric pallet jack. The electric pallet jack 210 is provided with wheels 214 which may preferably, but not necessarily, be raised and lowered. In this manner, the wheels 214 may be raised to move the dross pressing apparatus and may be lowered to firmly secure the dross pressing apparatus in a location of a plant without concern for its possible movement. The pallet jack may be provided with a handle for 216 for moving the pallet jack around and for other operations. Pallet jack 214 is provided with a housing 248 which may contain rechargeable electric battery, a hydraulic pump and controls for the wheels 214 and the like.

A dross pressing apparatus substantially as described with respect to FIGS. 1 through 8 may be constructed on tines 220 and 222, utilizing a frame 212 having a travelling frame 36 riding thereon, but without wheels 14 or tines 16 as described with respect to FIG. 1. The structure would also vary slightly in that a plate 218 would be provided across tines 220 and 222 for the mounting of the hydraulic cylinder 246. Controls for the hydraulic cylinder 246 may be contained in housing 247. The upper portion of the dross pressing apparatus including the sow mold, skim pot, press head and upper portion of the frame are not shown again in FIGS. 10 and 11 as it would be merely repetitive of the structure shown and described with respect to FIGS. 1 through 8.

In view of the above, the present invention may be embodied in other specific forms without departing from the spirit or essential attributes thereof and, accordingly, reference should be made to the appended claims, rather than to the foregoing specification as indicating the scope of the invention.

What is claimed is:

1. A dross pressing apparatus, comprising:
   a frame;
   means for making said frame portable;
   a press head mounted to an upper portion of said frame; and
   means for forcing a skim pot upwardly into juxtaposed position with said press head wherein dross within said skim pot may be compressed between said skim pot and said press head.

2. A dross pressing apparatus in accordance with claim 1 wherein said means for making said frame portable comprises wheels mounted to said frame.

3. A dross pressing apparatus in accordance with claim 1 wherein said means for making said frame portable comprises fork lift tubes mounted to said frame.

4. A dross pressing apparatus in accordance with claim 1 wherein said head includes ribs on its surface.

5. A dross pressing apparatus in accordance with claim 1 wherein said head is constructed of cast steel.

6. A dross pressing apparatus in accordance with claim 1 wherein said head is constructed of refractory material.

7. A dross pressing apparatus in accordance with claim 6 wherein said refractory material is mounted to a metal plate comprised of steel.

8. A dross pressing apparatus in accordance with claim 1 wherein said skim pot includes ribs.

9. A dross pressing apparatus in accordance with claim 7 wherein said ribs on said skim pot mate with ribs on said head.

10. A dross pressing apparatus in accordance with claim 1 wherein said skim pot is comprised of cast steel.

11. A dross pressing apparatus in accordance with claim 1 wherein said skim pot is constructed of a refractory material within a metal shell.

12. A dross pressing apparatus in accordance with claim 11 wherein said metal shell is comprised of steel.

13. A dross pressing apparatus in accordance with claim 1 wherein said means for forcing said skim pot upwardly is a hydraulic piston.

14. A dross pressing apparatus in accordance with claim 1 wherein said means for forcing said skim pot upwardly is an electric motor drive means.

15. A dross pressing apparatus in accordance with claim 1 wherein said skim pot is mounted within a traveling frame movably mounted to said frame.

16. A dross pressing apparatus in accordance with claim 15 wherein said traveling frame includes mounting means for a skim pot and mounting means for a sow mold.

17. A dross pressing apparatus in accordance with claim 16 wherein said mounting means for said skim pot includes a pivot for said skim pot and means for rotating said skim pot around said pivot means for dumping said skim pot.

18. A dross pressing apparatus in accordance with claim 16 wherein said mounting means for said sow mold includes means for slidably moving the sow mold in a horizontal plane to a position where the sow mold is outside of said frame.

19. A dross pressing apparatus in accordance with claim 1 including means for preheating said skim pot prior to initial operation of the dross press.

20. A dross pressing apparatus in accordance with claim 19 wherein said means for preheating said skim pot comprises a gas burner.

21. A dross pressing apparatus in accordance with claim 19 wherein said means for preheating said skim pot is by means of electrical resistance heaters.

22. A dross pressing apparatus in accordance with claim 21 wherein said electrical resistance heaters are embedded within a ceramic portion of said skim pot.

23. A dross pressing apparatus in accordance with claim 1 wherein said skim pot is provided with a removable insert in a lower portion thereof, said removable insert including a drain hole.

24. A dross pressing apparatus in accordance with claim 1 wherein said skim pot is provided with vibratory motion when said skim pot is in juxtaposition said press head.

25. A dross press apparatus in accordance with claim 11 wherein a layer of insulation is provided between said refractory material and said metal shell.

26. A dross pressing apparatus in accordance with claim 1 wherein said means for making said frame portable includes an electric pallet jack having a pair of pallet tines, said frame being mounted upon said tines, said tines being provided with wheels.

27. A dross pressing apparatus in accordance with claim 26 wherein said wheels are retractable.

28. A dross pressing apparatus in accordance with claim 27 wherein said electric pallet jack includes a rechargeable battery and a hydraulic system for operation of said retractable wheels.

29. A dross press apparatus in accordance with claim 1 wherein said frame is mounted on an electric pallet jack.

* * * * *